US009869225B2

(12) United States Patent
Muruganantham et al.

(10) Patent No.: US 9,869,225 B2
(45) Date of Patent: Jan. 16, 2018

(54) DOSER MOUNTING SYSTEM, COMPONENTS AND METHODS

(71) Applicant: Cummins Emission Solutions, Inc., Columbus, IN (US)

(72) Inventors: Karthik Muruganantham, Stoughton, WI (US); Achuth Munnannur, Madison, WI (US); Deepesh Goyal, Columbus, IN (US); Ken Hummel, Barneveld, WI (US); Vinay Kumar Joshi, Pune (IN); Vipin Iyer, Madison, WI (US)

(73) Assignee: Cummins Emission Solutions, Inc., Columbus, IN (US)

( * ) Notice: Subject to any disclaimer, the term of this patent is extended or adjusted under 35 U.S.C. 154(b) by 183 days.

(21) Appl. No.: 14/636,991

(22) Filed: Mar. 3, 2015

(65) Prior Publication Data
US 2015/0252711 A1  Sep. 10, 2015

Related U.S. Application Data

(60) Provisional application No. 61/948,857, filed on Mar. 6, 2014.

(51) Int. Cl.
F16M 1/00 (2006.01)
F16M 3/00 (2006.01)
(Continued)

(52) U.S. Cl.
CPC ....... F01N 3/2066 (2013.01); F01N 13/1805 (2013.01); B60K 13/04 (2013.01);
(Continued)

(58) Field of Classification Search
CPC ....................................................... F16M 7/00
(Continued)

(56) References Cited

U.S. PATENT DOCUMENTS 1,035,782 A * 8/1912 Fowler ............ F21V 21/02
  248/343
2,196,702 A * 4/1940 Leighton ............ B60G 7/00
  267/67
(Continued)

FOREIGN PATENT DOCUMENTS

EP       2 134 939 B1   6/2012
WO    WO2012/107484 A1   8/2012

Primary Examiner — Terrell McKinnon
Assistant Examiner — Michael McDuffie
(74) Attorney, Agent, or Firm — Foley & Lardner LLP

(57) ABSTRACT

A system and method for providing a selective catalytic reduction system with a doser mounting system. A mounting plate includes an aperture in a surface with a plurality of fastener brackets coupled to the surface. The fastener brackets are positioned about a peripheral portion of the aperture. The fastener brackets each include an opening for inserting a fastener. The opening is elevated from the surface of the mounting plate. The fasteners each have a fastener head and a fastener shaft positioned in the opening of the fastener brackets. The fastener shaft extends from the opening in a direction having an orthogonal component with respect to the surface of the mounting plate. A doser is coupled to the doser mounting system. The fastener shafts extend through openings in legs of the doser. An injector port of the doser is aligned with the aperture in the mounting plate.

20 Claims, 8 Drawing Sheets

(51) Int. Cl.
*F16M 5/00* (2006.01)
*F16M 7/00* (2006.01)
*F16M 9/00* (2006.01)
*F16M 11/00* (2006.01)
*F01N 3/20* (2006.01)
*F01N 13/18* (2010.01)
*B60K 13/04* (2006.01)

(52) U.S. Cl.
CPC ....... *F01N 2610/1453* (2013.01); *Y02T 10/24* (2013.01); *Y10T 29/49826* (2015.01)

(58) Field of Classification Search
USPC .... 248/544, 638, 671, 672, 674, 678, 213.3, 248/219.3, 309.1, 310, 314, 342, 343, 200
See application file for complete search history.

(56) References Cited

U.S. PATENT DOCUMENTS

| | | | | |
|---|---|---|---|---|
| 5,102,090 A * | 4/1992 | Farris | .................. | F16M 7/00 248/674 |
| 5,524,860 A * | 6/1996 | Ives | .................. | F04B 39/12 248/674 |
| 6,062,528 A * | 5/2000 | Beck | .................. | B60T 8/3685 248/224.8 |
| 6,099,190 A * | 8/2000 | Honobe | .................. | B60T 8/3685 248/225.11 |
| 6,920,867 B2 * | 7/2005 | Cutts | .................. | F02B 33/40 123/184.21 |
| 7,229,061 B2 * | 6/2007 | Battig | .................. | F01D 25/243 248/677 |
| 7,654,239 B2 * | 2/2010 | Anthon | .................. | B32B 5/26 123/184.53 |
| 8,261,537 B2 | 9/2012 | Osbat et al. | | |
| 2009/0248361 A1 * | 10/2009 | Franco | .................. | F01N 3/0253 702/182 |
| 2013/0223910 A1 * | 8/2013 | Anderson | .................. | B41J 11/42 400/578 |
| 2014/0363357 A1 * | 12/2014 | Trivedi | .................. | F01N 3/2066 423/212 |
| 2015/0204096 A1 * | 7/2015 | Panzella | .................. | E04H 4/1654 248/674 |

* cited by examiner

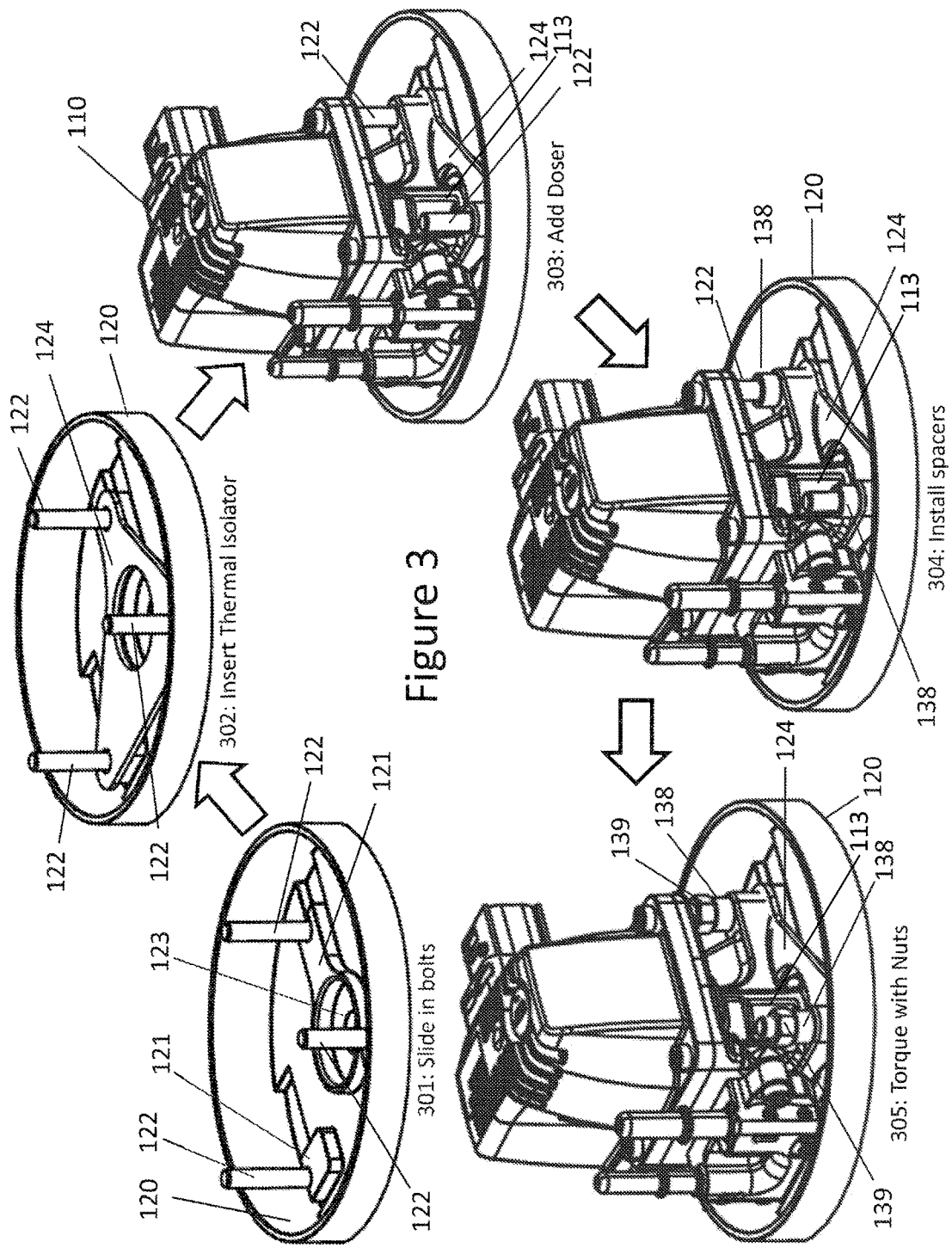

DOSER MOUNTING SYSTEM, COMPONENTS AND METHODS

CROSS-REFERENCE TO RELATED APPLICATION

The present application claims the benefit of and priority to U.S. Provisional Patent Application No. 61/948,857, filed Mar. 6, 2014, which is incorporated herein by reference in its entirety.

TECHNICAL FIELD

The present application relates generally to the field of emission controls. More specifically, the present application relates to systems for treating exhaust with a reductant fluid introduced using an injection system or doser system.

BACKGROUND

Increasingly stringent emissions standards require treatment systems to prevent or reduce harmful emissions being released to the atmosphere as by-products of combustion processes in systems, such as diesel engines. Systems that reduce harmful emissions by treating fluids, such as gases, being released from an engine, such as a diesel engine, are generally subjected to high heat and/or high pressure as the exhaust is expelled through the exhaust components. Systems for treating harmful exhaust emissions often include a catalytic device and doser system that injects a fluid, such as a specific reductant, into the exhaust stream to chemically reduce harmful emissions like oxides of nitrogen ($NO_x$) on that catalyst. Such doser systems may include a variety of electrical and mechanical components, which are susceptible to failure when subjected to excessive heat. Additionally, the location of these exhaust components relative to the engine on end-user equipment presents a number of challenges related to mechanical durability (e.g., random vibrations, shock), serviceability, ease of cooling, etc.

SUMMARY

Various embodiments provide a selective catalytic reduction system that includes a doser mounting system. The doser mounting system includes a mounting plate having an aperture in a surface of the mounting plate and a plurality of fastener brackets coupled to the mounting plate. In particular embodiments, each fastener sub-assembly may comprise a fastener and fastener bracket, where the fastener brackets may be configured to receive the fastener. The fastener brackets are positioned about a peripheral portion of the aperture. The fastener brackets include an opening, which may be formed as a slot, in particular embodiments, for inserting the fastener in place. The opening is elevated from the surface of the mounting plate. The doser mounting system also includes a plurality of fasteners having a fastener head and a fastener shaft positioned in the opening of the fastener brackets such that the fastener head is disposed between a portion of the fastener bracket and the surface of the mounting plate. The fastener shaft extends from the slot in a direction having an orthogonal component with respect to the surface of the mounting plate. The doser mounting system may also include a thermal isolator coupled to the plurality of fasteners on the fastener shaft, in particular embodiments. The selective catalytic reduction system includes a doser coupled to the doser mounting system, via the plurality of fasteners, wherein the fastener shafts extend through openings in legs or the body of the doser. The selective catalytic reduction system further includes a plurality of nuts coupled to the fastener shafts, such that the openings in the legs of doser are positioned between the nuts and the thermal isolator and wherein injector port of the doser is aligned with the aperture in the mounting plate.

In particular embodiments, the fastener is coupled to fastener bracket such that an air gap is maintained between the head of the fastener and the surface of the mounting plate. In particular embodiments, the elevated openings may include a plurality of discrete sides having a shape, corresponding at least in part to the shape of the head of the fasteners. The doser mounting system is operatively coupled to a muffler at an inlet port in the muffler, in accordance with particular embodiments. In particular embodiments, the system may include a spacer disposed between the nuts and the opening in the doser leg. The thermal isolator is composed of low thermal conductive material such as mica in particular embodiments.

Other various embodiments provide for a doser mounting system that includes a mounting plate including an aperture and a plurality of fastener brackets coupled to the mounting plate where the fastener brackets are positioned about a peripheral portion of the aperture and where the fastener brackets include an opening elevated a distance from a surface of the mounting plate. The doser mounting system further includes a plurality of fasteners having a fastener head and a fastener shaft positioned in the openings of the fastener brackets such that the fastener head is disposed between the fastener bracket and the surface of the mounting plate. The fastener shaft extends from the opening in a direction having a substantially orthogonal component with respect to the surface of the mounting plate. The doser mounting system further includes a thermal isolator coupled to the plurality of fasteners on the fastener shaft.

In various embodiments, the elevated openings may include a plurality of discrete sides having a shape, corresponding at least in part to a shape of the head of the fasteners.

Other various embodiments provide a method of coupling a doser system to a doser mounting system. The method includes coupling a plurality of fasteners to a plurality of fastener brackets coupled to a surface of a mounting plate. The mounting plate includes an aperture in the surface of the mounting plate. The plurality of fastener brackets is positioned about a peripheral portion of the aperture. The fastener brackets include an opening elevated from a surface of the mounting plate. In particular embodiments, the opening may comprise a slot. A plurality of fasteners having a fastener head and a fastener shaft are coupled to the fastener brackets such that the fastener head is disposed between a portion of the fastener bracket and the surface of the mounting plate. The fastener shaft extends from the opening in a direction having an orthogonal component with respect to the surface of the mounting plate. A thermal isolator is coupled to the plurality of fasteners on the fastener shaft, and a doser is coupled to the plurality of fasteners such that the fastener shafts extend through openings in legs of the doser and such that an injector port of the doser aligns with the aperture in the mounting plate. A plurality of nuts are coupled to the fastener shafts, such that the openings in the legs of doser are positioned between the nuts and the gasket and such that a space is maintained between the fastener head and the surface of the mounting plate.

In particular embodiments, the method further includes coupling the mounting plate to a muffler body. Other embodiments may include coupling the mounting plate to an exhaust tube upstream of the Selective Catalytic Reduction device. Additionally, the method may include coupling a plurality of spacers to the plurality of fasteners such that a spacer is disposed between the nut and the opening in the doser leg, in accordance with particular embodiments.

The inventors have appreciated that the implementation and use of various embodiments may result in beneficial doser systems, components and methods which may be implemented in a manner that reduces heat related failures and improves reliability and serviceability. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIG. 3 is a schematic of a process for connecting a doser system to a doser mounting system in accordance with exemplary embodiments.

The features and advantages of the inventive concepts disclosed herein will become more apparent from the detailed description set forth below when taken in conjunction with the drawings.

DETAILED DESCRIPTION

Following below are more detailed descriptions of various concepts related to, and embodiments of inventive systems, and methods of implementing a selective catalytic reduction system including a doser system. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Figure 1:
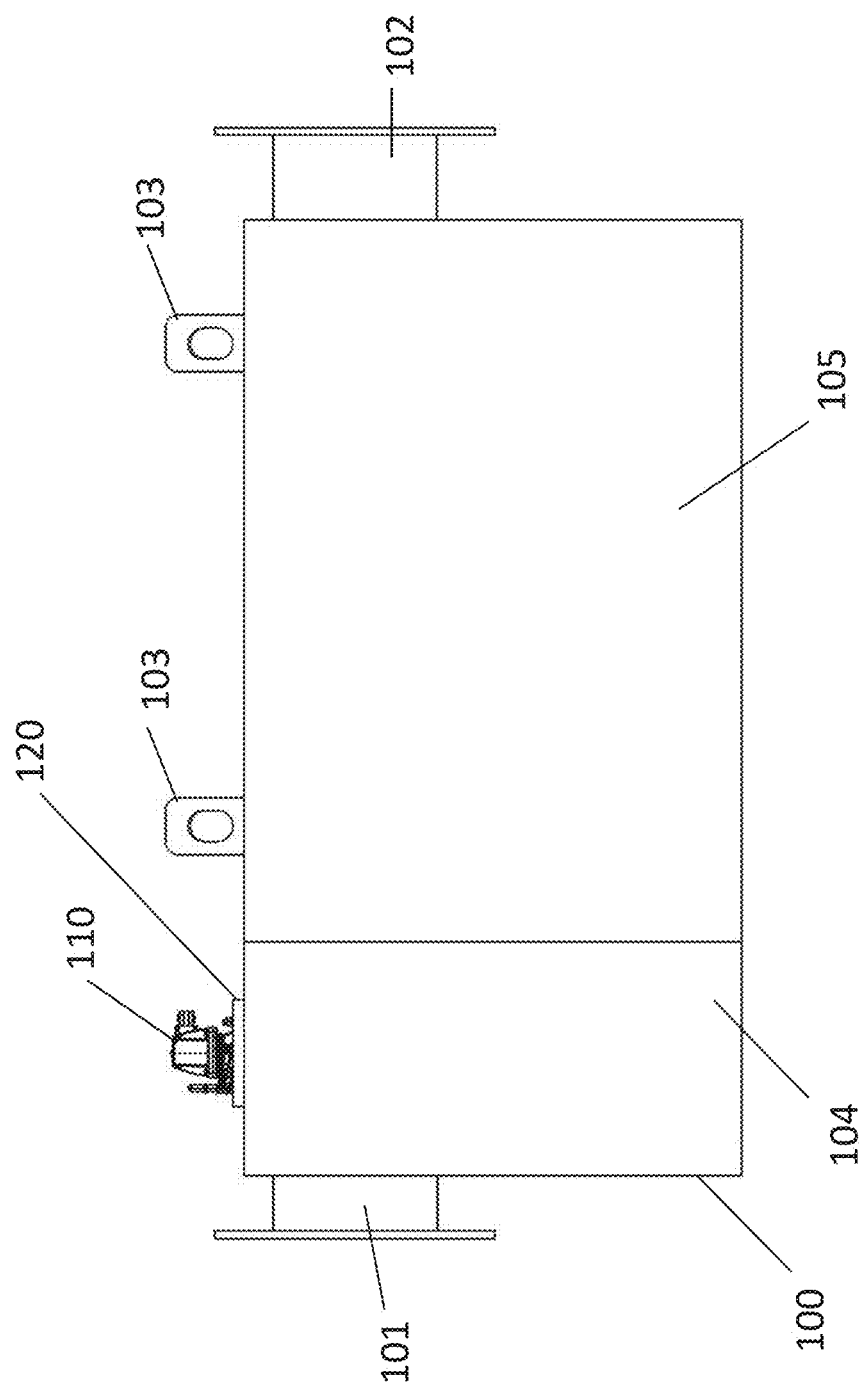
FIG. 1 is a front view of an exhaust component including a doser system coupled thereto in accordance with exemplary embodiments.

FIG. 1 is a front view of an exhaust component including a doser system coupled thereto in accordance with exemplary embodiments. FIG. 1 illustrates a selective catalytic reduction (SCR) system 100 connectable to an exhaust pipe for receiving exhaust fluid from an engine such as a diesel engine. An exhaust pipe extending from an engine manifold may connect directly or indirectly to an inlet port 101 on the SCR system 100 in the decomposition section 104. The exhaust pipe carries gases exhausted by an engine, such as a diesel engine, as a result and by-product of combustion in the engine out of the engine. The SCR system 100 may also include muffler components to modify the sound characteristics of the exhausting gases before the gases (and or liquid) are expelled through the exit port 102, located in the substrate section 105 of the SCR system 100 for release to the atmosphere. The SCR system 100 may be mounted a substantial distance (several meters) away from the engine and may be moved into place via brackets 103. Untreated exhaust fluids may contain oxides of nitrogen ($NO_x$) at levels exceeding the allowable limits permitted by emissions standards. The temperature of the exhaust fluid passing through the SCR system 100 may be in the range of about 50 degrees Celsius-about 650 degrees Celsius and the pressure may be on the order of up to about 5000 Pascal. As demonstrated in the illustrated embodiment, a doser system 110 may be mounted on an exhaust component such as the SCR system 100 to reduce the concentration of by-products such as $NO_x$ in the exhaust and/or reduce the noise level before the exhaust is expelled to the atmosphere in a treatment process referred to as after-treatment. Accordingly, the doser system 110 is subjected to the high temperature, high pressure exhaust both directly through for example a port permitting the doser system 110 to inject a reductant or diesel exhaust fluid, into the exhaust flow and the system is subjected to heat conducted by the SCR system 100, which may be composed of a metal or other highly conductive (heat) materials. The doser system 110 is also subjected to the vibrations received by the SCR system 100, which may be transmitted by the engine and/or the vehicle and may be intense for example in a high horsepower diesel engine application on a vehicle suitable for heavy duty and/or off road use.

Figure 2A:
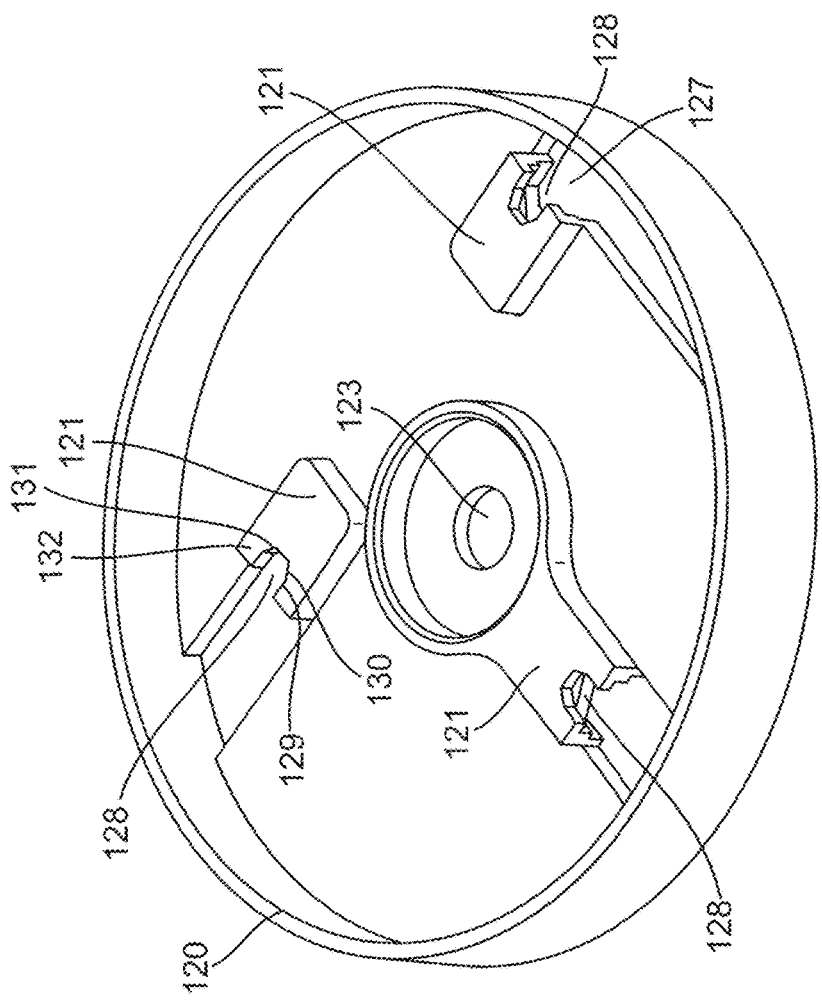
FIG. 2A is perspective view of a doser mounting system in accordance with exemplary embodiments.
Figure 2B:
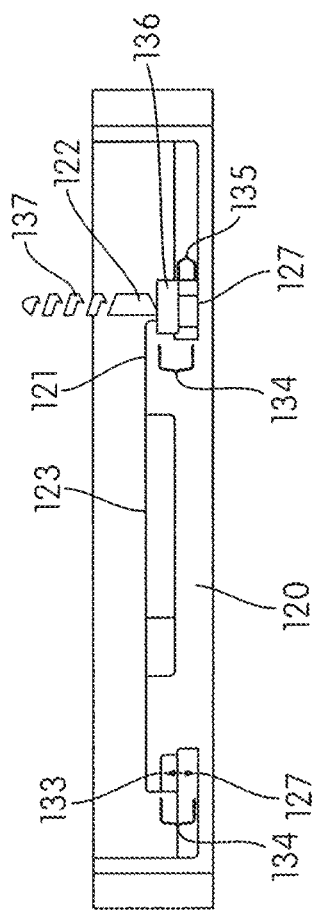
FIG. 2B is a profile cut away view of the doser mounting system of FIG. 2A.

FIG. 2A is perspective view of a doser mounting system in accordance with exemplary embodiments. FIG. 2B is a profile cut away view of the doser mounting system of FIG. 2A. The doser mounting system includes a mounting plate 120. The mounting plate 120 may be configured in a circular shape as demonstrated in the illustrated embodiment, but may be embodied in other shapes. The mounting plate 120 is generally flat, but may be contoured in various embodiments to facilitate engagement with an SCR system. The mounting plate 120 may be coupled to the SCR system 100 by welding. Other options for coupling the mounting plate 120 to the SCR system 100 may be employed in particular embodiments, including, but not limited to coupling by fasteners or clamps. In particular embodiments, the mounting plate 120 may be integrally formed with the SCR system 100. The mounting plate 120 includes an aperture 123 that functions as a doser port to permit the injector from the doser to align or engage with an aperture in the SCR system 100. In the illustrated embodiment, the aperture 123 is centrally located on the mounting plate 120. The aperture 123 may be raised or the mounting plate may include other dimples to facilitate alignment or engagement of the mounting plate 120 with corresponding raised surfaces on the SCR system 100. The aperture 123 may also be configured in a counterbored geometry in various embodiments for alignment or engagement with the doser injector. The mounting plate 120 includes a plurality of fastener brackets 121 for mounting fasteners 122. The fasteners 122 may comprise a bolt in particular embodiments, and the fastener brackets 121 may be configured for receiving the bolt. While the illustrated exemplary embodiment depicts three fastener brackets 121, other embodiments may include more or fewer fastener brackets. As shown in FIG. 2, the fastener brackets 121 may be raised from an upper surface 127 of the mounting plate 120. The fastener brackets 121 may be coupled to the mounting plate 120 in a cantilevered type fashion (e.g. at the end) or may be coupled along a length of the fastener brackets 121. Having the fastener brackets 121 configured in a raised structure permits opening 128 in the fastener bracket 121 to be elevated, which permits the head of fasteners 122 to be positioned between a portion of the fastener bracket 121 and the upper surface 127, such that the fastener shaft 137 extends away from the upper surface 127, generally in an orthogonal direction with respect to the upper surface 127. In particular embodiments, the opening 128 may be configured as an elongated slot. As depicted in the illustrated embodiment, the opening 128 may include a plurality of distinct sides 129-132. The distinct sides 129-132 may be undercut or recessed within the bracket. The number and angle of the distinct sides in the opening 128 may be configured to correspond to the shape of at least a portion of the shape of a fastener head (such as the fastener 122 shown in FIG. 3), such that when the fastener is positioned in the opening, these sides prevent the fastener from turning when being secured by a coupling component such as a nut. In the illustrated embodiment, the opening 128 includes the four distinct sides 129-132 configured to correspond to four sides of a fastener head 136 which is configured in a hexagonal shape.

In addition to permitting the fasteners 122 to be coupled such that the fastener shaft 137 extends away from the mounting bracket (e.g. inverted), raised fastener brackets 121 may be raised such that the distance 134 between surface 133 of the opening 128 of the fastener bracket 121 and upper surface 127 is greater than the height of the fastener head 136. The distance 134 having a magnitude greater than the height of the fastener head 136 permits the fastener 122 to be coupled to the fastener bracket such that a gap 135 is maintained between the top surface of the fastener head 136 and the upper surface 127 upon securing the fastener to the bracket such that bottom of the fastener head 136 (e.g., the surface at the intersection of the fastener head and fastener shaft) engages the surface 133 of the opening 128 of the fastener bracket 121. Inverting the fastener 122 and coupling the fastener 122 to the fastener bracket 121 such that a space or the gap 135 is maintained between the fastener head 136 and the upper surface 127 of the mounting plate 120 permits a doser coupled to the fasteners to be maintained at a significantly lower temperature as the gap 135 allows air flow between the fastener 122 and the mounting plate 120 that reduces the heat transfer from the mounting plate 120 to the fasteners 122 and hence reduces the heat transfer to the doser system 110.

FIG. 3 is a schematic of a process for connecting the doser system to a doser mounting system in accordance with exemplary embodiments. At 301, the fasteners 122 are slidably positioned into the openings 128 in fastener brackets 121 in an inverted configuration such that the fastener head is positioned between an elevated portion of the bracket and the upper surface 127 of the mounting plate 120. At 302, a thermal isolator 124 is added. The thermal isolator 124 may be composed of lower thermal conductive material such as mica in various embodiments such that it reduces heat transfer. The thermal isolator 124 includes an opening for coupling to the fastener brackets and includes a central opening permitting the injector of the doser to extend there through for alignment or engagement with the aperture 123 in the mounting plate 120. In some embodiments, the fastener openings may be configured as a recess (e.g. not completed enclosed by thermal isolator material. At 303, the doser system 110 is coupled to the mounting plate by inserting the fasteners 122 through openings in doser legs 111. The doser legs 111 extend from the doser body, which houses the injector and other associated components, which reduce the harmful emissions in exhaust transmitted through the SCR system 100. The doser is positioned such that the injector 113 aligns with or engages the aperture 123 on the mounting plate 120. The doser is then secured to the mounting plate 120. In various embodiments, as depicted at 304, spacers 138 may be added to the fasteners 122 before fasteners, such as nuts 139 are coupled to the fasteners 122 to secure the doser system 110 to the mounting plate 120 at 305. In various embodiments, as the nuts 139 are tightened to the fasteners 122, the fastener heads 136 are pulled tight with the fastener brackets 121 (e.g. flush with the surface 133), thereby maintaining the gap 135 between the top of the fastener head 136 and the upper surface 127 of the mounting plate 120 for passive cooling. In particular embodiments, the fastener brackets 121 may include a retaining feature, such as a plurality of threads, such that the fastener brackets 121 may integrally retain fasteners 122 without a separate and removable nut.

Figure 4:
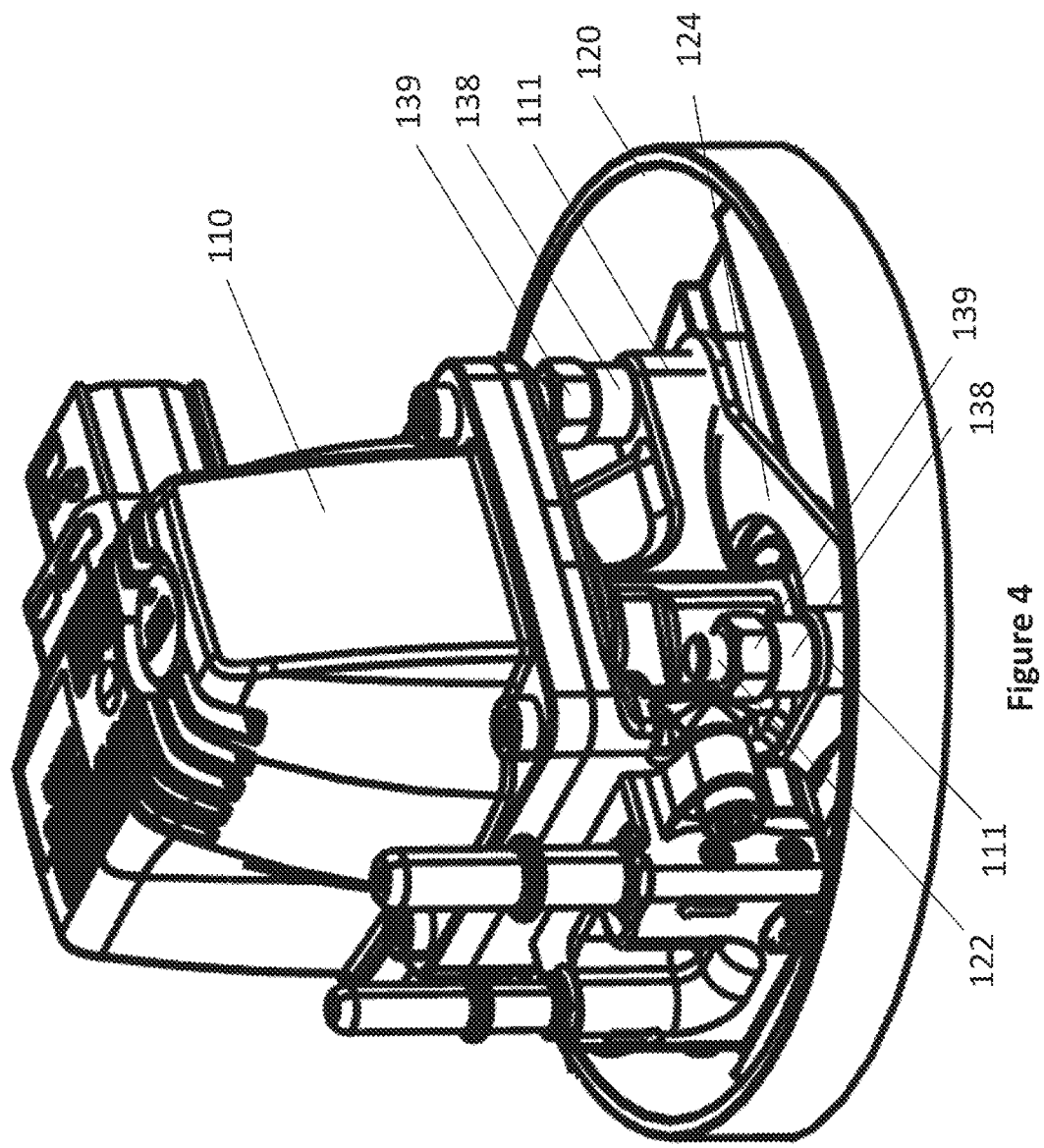
FIG. 4 is a perspective view of a doser system coupled with a doser mounting system in accordance with exemplary embodiments.

FIG. 4 is a magnified perspective view of the doser system 110 coupled with the mounting plate 120, in accordance with exemplary embodiments. FIG. 4 shows the unit as assembled after completion of step 5 of FIG. 3.

Figure 5:
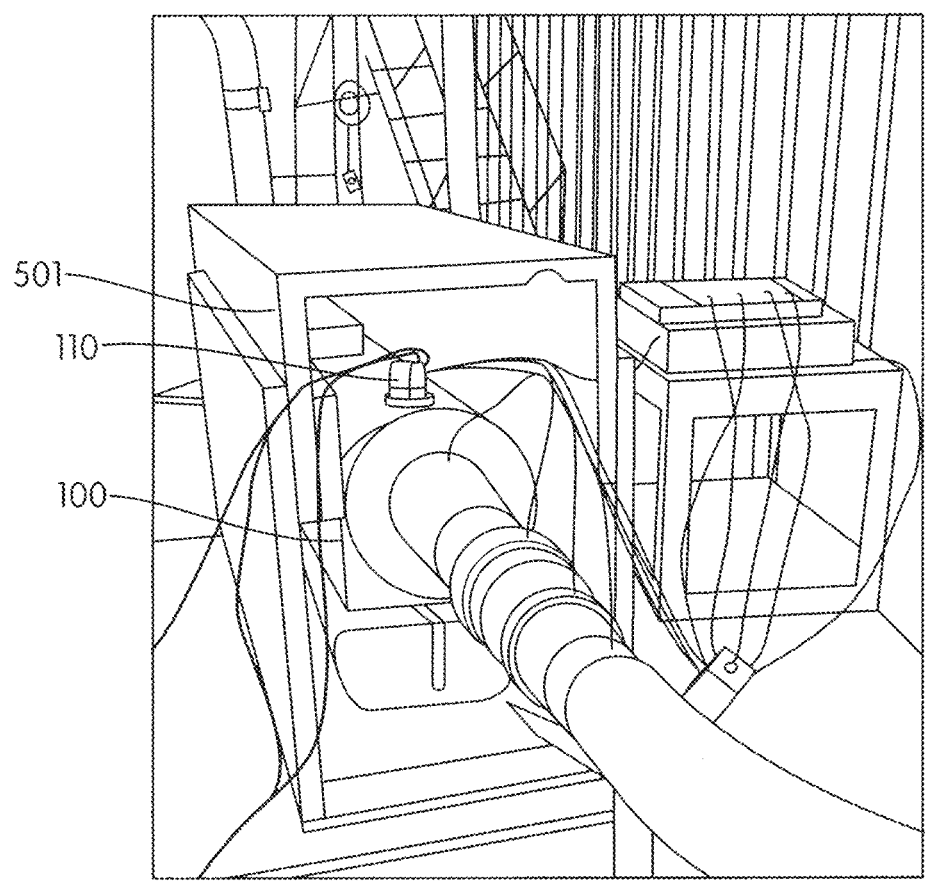
FIG. 5 illustrates a testing system for a doser system implemented in accordance with exemplary embodiments.

FIG. 5 illustrates a testing system for a doser system implemented in accordance with exemplary embodiments. The testing system includes an enclosed chamber 501 having the selective catalytic reduction system (SCR) including a doser system, such as the doser system 110, positioned therein. The enclosed chamber 501 is configured to simulate the temperatures experienced by the exhaust component such as the SCR system 100 in actual applications. The test apparatus also includes an air source to simulate air flow experienced by the doser system and exhaust as they would when mounted to a vehicle as the vehicle moves. Tests were conducted that simulated the worst case engine operating parameters as well as ambient conditions. When traditional doser mounting system designs have been exposed to similar conditions in past, they exceeded temperature limits for the fluid, subsequently resulting in failures like clogged injector, severe corrosion, fluid leakage, etc. The test demonstrated the ability of doser system 110 to preclude failures related to exceeding temperature limits for the fluid, clogged injectors, severe corrosion, and fluid leakage at least in part by reducing and limiting the physical temperatures at several critical locations on the doser system 110, SCR system 100 and for the fluid itself.

Figure 6:
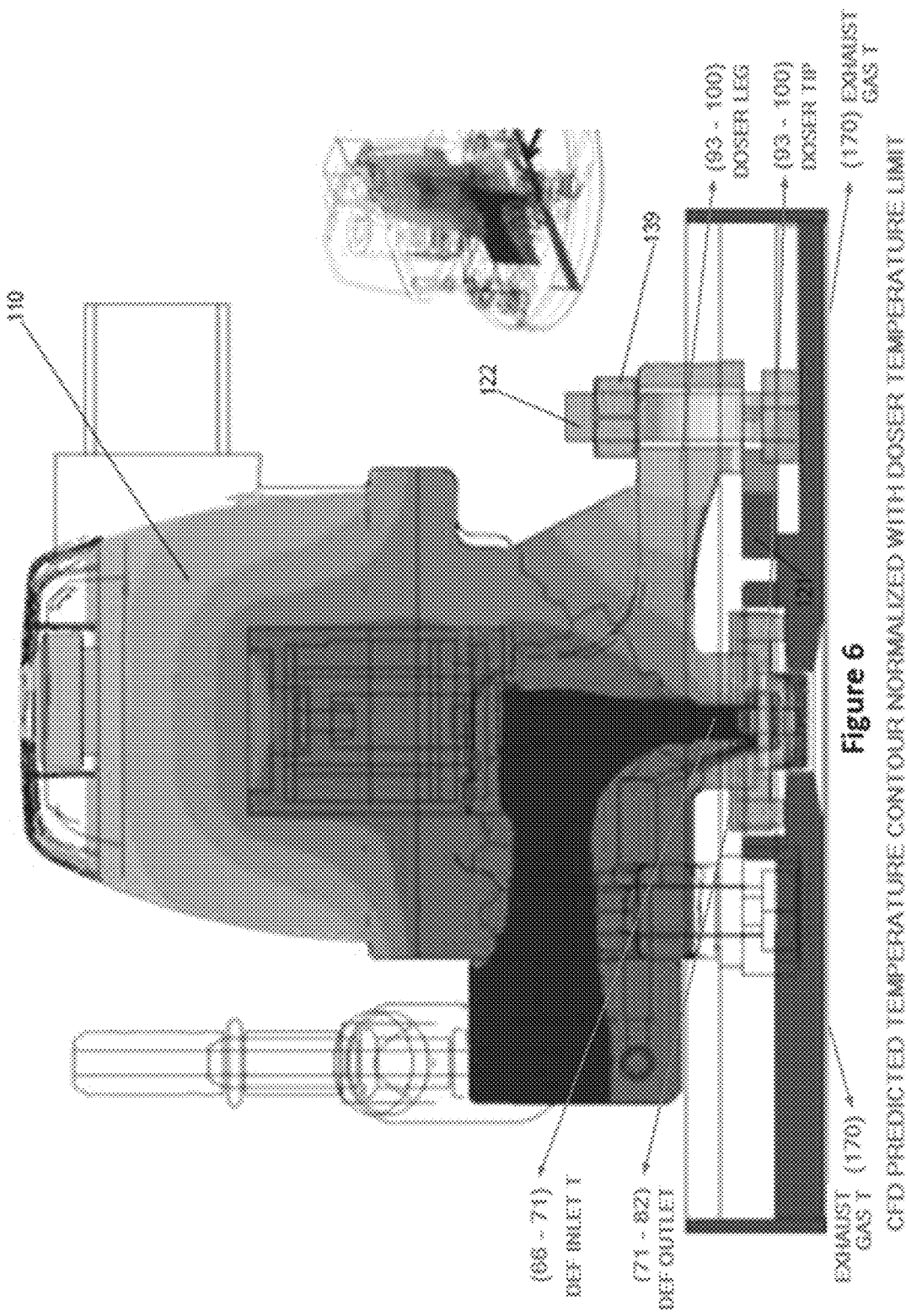
FIG. 6 shows a thermal analysis of a doser system subjected to a heat test via the testing system of FIG. 5 in accordance with exemplary embodiments.

FIG. 6 shows a computational fluid dynamics analysis of a doser system subjected to thermal boundary conditions obtained via the testing system of FIG. 5 in accordance with exemplary embodiments. As demonstrated by the contrast in the temperature of the SCR muffler vs. the doser legs and bodies, embodiments disclosed herein help maintain a temperature differential between the doser and the muffler body.

Figure 7:
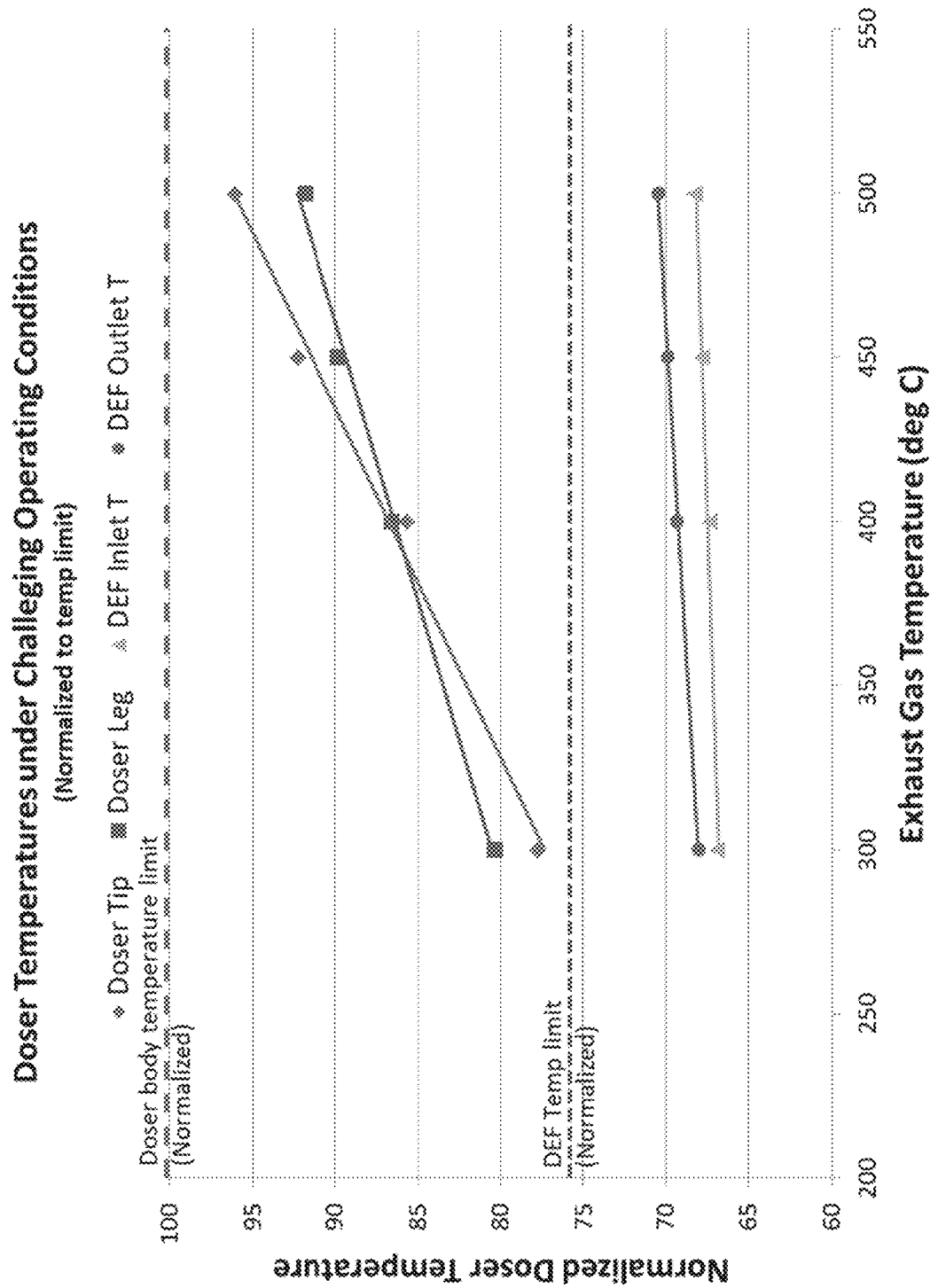
FIG. 7 provides a graph illustrating specific temperatures experienced by components of the doser system in response to specific exhaust temperatures experienced by the muffler.

FIG. 7 provides a graph illustrating temperatures experienced by components of the doser system 110 in response to specific exhaust temperatures experienced by the SCR system 100. The y-axis, representing response temperatures, has been normalized against the temperature limit specified for doser systems.

During the testing procedures, the mounting plate 120 significantly reduced heat transfer to the doser system 110 and prevented the doser system 110 from over-heating. The mounting plate 110 also successfully sustained the severe vehicle vibration profiles validating structural integrity.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of apparatuses or the components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, describes techniques, or the like, this application controls.

While various inventive embodiments have been described and illustrated herein, those of ordinary skill in the art will readily envision a variety of other mechanisms and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, the technology described herein may be embodied as a method, of which at least one example has been provided. The acts performed as part of the method may be ordered in any suitable way unless otherwise specifically noted. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

The invention claimed is:

1. A selective catalytic reduction system comprising:
   a doser mounting system including:
   a mounting plate including an aperture in a surface of the mounting plate,
   a plurality of fastener brackets coupled to the mounting plate, the plurality of fastener brackets positioned about a peripheral portion of the aperture, at least a portion of each of the plurality of fasteners brackets being spaced from the mounting plate, each of the plurality of fastener brackets including an opening in the portion that is spaced from the mounting plate, and
   a plurality of fasteners each having a fastener head and a fastener shaft positioned in the openings of the plurality of fastener brackets such that each fastener head is disposed between the surface of the mounting plate and the portion of the respective fastener bracket that is spaced from the mounting plate, each fastener shaft extending from a respective opening in a direction having an orthogonal component with respect to the surface of the mounting plate; and
   a doser coupled to the doser mounting system, via the plurality of fasteners, wherein the fastener shafts extend through openings in legs of the doser, wherein an injector port of the doser is aligned with the aperture in the mounting plate.

2. The system according to claim 1, wherein each fastener is coupled to a respective fastener bracket such that a space is maintained between the fastener head and the surface of the mounting plate.

3. The system according to claim 1, wherein the elevated openings comprise elevated slots.

4. The system according to claim 3, wherein each elevated slot includes a plurality of discrete sides having a shape corresponding, at least in part, to a shape of the fastener head of a respective fastener of the plurality of fasteners.

5. The system according to claim 1, further comprising a plurality of nuts coupled to the plurality of fastener shafts, such that the openings in the legs of the doser are positioned between the nuts and a thermal isolator coupled to the plurality of fasteners on the fastener shaft.

6. The system according to claim 1, further comprising a thermal isolator coupled to the plurality of fasteners on the fastener shafts.

7. The system according to claim 6, wherein the plurality of fastener brackets are coupled to the mounting plate along a length of a respective fastener bracket of the plurality of fastener brackets.

8. The system according to claim 6, wherein the thermal isolator comprises a low thermal conductive material.

9. The system according to claim 6, wherein the low thermal conductive material comprises mica.

10. The system according to claim 1, wherein the doser mounting system is coupled to a muffler at an inlet port in the muffler.

11. The system according to claim 1, further comprising a plurality of nuts coupled to the plurality of fastener shafts and a spacer disposed between the plurality of nuts and the openings in the legs of the doser.

12. A doser mounting system comprising:
    a mounting plate including an aperture;
    a plurality of fastener brackets coupled to the mounting plate, the fastener brackets positioned about a peripheral portion of the aperture, at least a portion of each of the plurality of fasteners brackets being spaced from the mounting plate, each of the fastener brackets including an opening in the portion that is spaced from the mounting plate;
    a plurality of fasteners each having a fastener head and a fastener shaft positioned in the openings of the fastener brackets such that each fastener head is disposed between the surface of the mounting plate and the portion of the respective fastener bracket that is spaced from the mounting plate, each fastener shaft extending from a respective opening in a direction having an orthogonal component with respect to the surface of the mounting plate; and a thermal isolator coupled to the plurality of fasteners via the fastener shafts.

13. The system according to claim 11, wherein each of the elevated openings include a plurality of discrete sides having a shape corresponding, at least in part, to a shape of the fastener head of a corresponding fastener of the plurality of fasteners.

14. The system according to claim 11, wherein each fastener bracket includes a plurality of threads configured to retain a corresponding fastener.

15. A method of coupling a doser system to a doser mounting system, the method comprising:

coupling a plurality of fasteners to a plurality of fastener brackets coupled to a surface of a mounting plate, the mounting plate including an aperture in the surface of the mounting plate, the plurality of fastener brackets positioned about a peripheral portion of the aperture, at least a portion of each of the plurality of fasteners brackets being spaced from the mounting plate, each of the fastener brackets including a bracket opening in the portion that is spaced from the mounting plate, wherein the plurality of fasteners each have a fastener head and a fastener shaft, and wherein the plurality of fasteners are coupled to the fastener brackets such that a respective fastener head is disposed between the surface of the mounting plate and the portion of the fastener bracket that is spaced from the mounting plate, the fastener shaft extending from the bracket opening in a direction having an orthogonal component with respect to the surface of the mounting plate;

coupling a thermal isolator to the plurality of fasteners via the fastener shafts;

coupling a doser to the plurality of fasteners such that the fastener shafts extend through openings in legs of the doser, wherein an injector port of the doser is aligned with the aperture in the mounting plate; and coupling a plurality of nuts to the fastener shafts, such that the openings in the legs of doser are positioned between the nuts and the thermal isolator and such that a space is maintained between the fastener head and the surface of the mounting plate.

16. The method of claim 15, further comprising coupling the mounting plate to a muffler.

17. The method of claim 15, further comprising coupling a plurality of spacers on the plurality of fasteners such that a spacer is disposed between the nut and the opening in the leg of the doser.

18. The method of claim 15, wherein the each of the elevated bracket openings include a plurality of discrete sides having a shape corresponding, at least in part, to a shape of the fastener head of a respective fastener of the plurality of fasteners.

19. The system according to claim 1, wherein each fastener head is partially covered by the portion of the respective fastener bracket that is spaced from the mounting plate.

20. The system according to claim 1, wherein an air gap is defined between the fastener head and the surface of the mounting plate when the fastener head is disposed between the surface of the mounting plate and the portion of the respective fastener bracket, the air gap configured to facilitate air flow between the fastener head and the mounting plate.

* * * * *